United States Patent
Asahina et al.

(10) Patent No.: US 11,162,578 B2
(45) Date of Patent: Nov. 2, 2021

(54) SHIFT DEVICE FOR VEHICLE

(71) Applicant: KABUSHIKI KAISHA TOKAI-RIKA-DENKI-SEISAKUSHO, Aichi (JP)

(72) Inventors: Naomi Asahina, Aichi (JP); Yutaka Inamura, Aichi (JP); Kenji Nakanishi, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 16/641,915

(22) PCT Filed: Aug. 17, 2018

(86) PCT No.: PCT/JP2018/030567
§ 371 (c)(1),
(2) Date: Feb. 25, 2020

(87) PCT Pub. No.: WO2019/044551
PCT Pub. Date: Mar. 7, 2019

(65) Prior Publication Data
US 2020/0182349 A1 Jun. 11, 2020

(30) Foreign Application Priority Data

Sep. 4, 2017 (JP) .............................. JP2017-169723

(51) Int. Cl.
| F16H 59/08 | (2006.01) |
| B60K 20/02 | (2006.01) |
| B60K 23/00 | (2006.01) |
| G05G 1/10 | (2006.01) |
| G05G 5/02 | (2006.01) |

(52) U.S. Cl.
CPC ............. *F16H 59/08* (2013.01); *B60K 20/02* (2013.01); *B60K 23/00* (2013.01); *G05G 1/10* (2013.01); *G05G 5/02* (2013.01); *F16H 2059/081* (2013.01); *G05G 2505/00* (2013.01)

(58) Field of Classification Search
CPC ... F16H 59/08; F16H 2059/081; B60K 20/02; B60K 23/00; G05G 1/10; G05G 5/02; G05G 2505/00
See application file for complete search history.

(56) References Cited

U.S. PATENT DOCUMENTS

| 2015/0152958 A1* | 6/2015 | Watanabe | ............... F16H 61/22 |
| | | | 74/473.12 |
| 2015/0167827 A1* | 6/2015 | Fett | ......... F16H 59/02 |
| | | | 74/473.3 |
| 2016/0238128 A1 | 8/2016 | Rake et al. | |
| 2017/0175883 A1* | 6/2017 | Watanabe | ............... F16H 61/22 |

FOREIGN PATENT DOCUMENTS

| JP | H03-282054 A | 12/1991 |
| JP | 2016-539836 A | 12/2016 |
| JP | 2017-136961 A | 8/2017 |

* cited by examiner

*Primary Examiner* — Vicky A Johnson
(74) *Attorney, Agent, or Firm* — Roberts Calderon Safran & Cole P.C.

(57) ABSTRACT

A shift device for a vehicle includes: a shift body that is moved and whose shift position is changed to a plurality of shift positions; a moving unit that moves the shift body; and a restricting body that restricts movement of the shift body by the moving unit at a predetermined shift position among the plurality of shift positions.

4 Claims, 7 Drawing Sheets

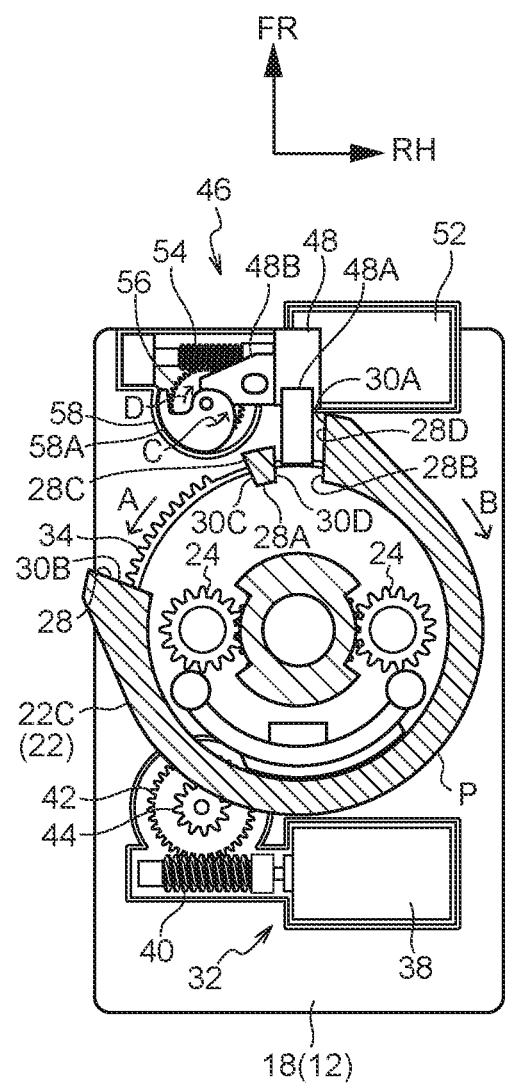

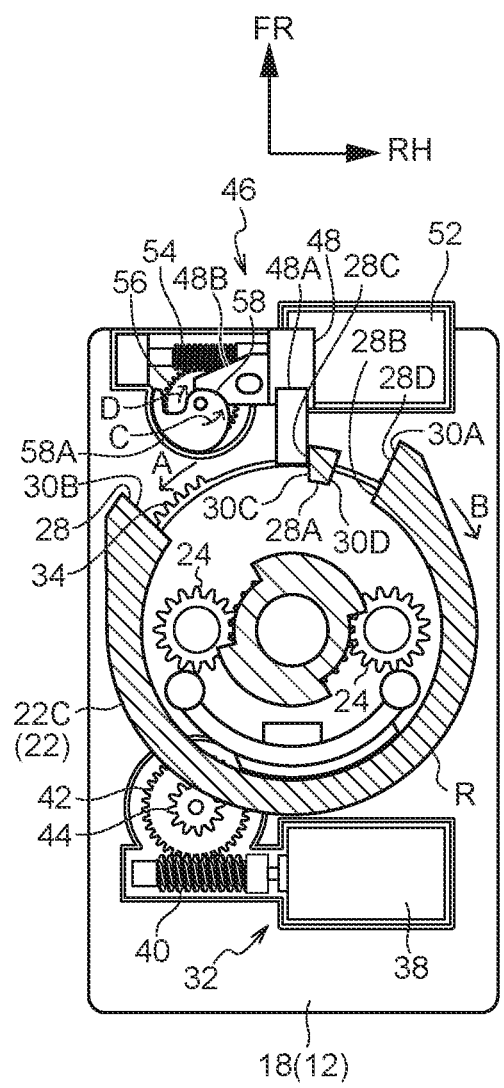

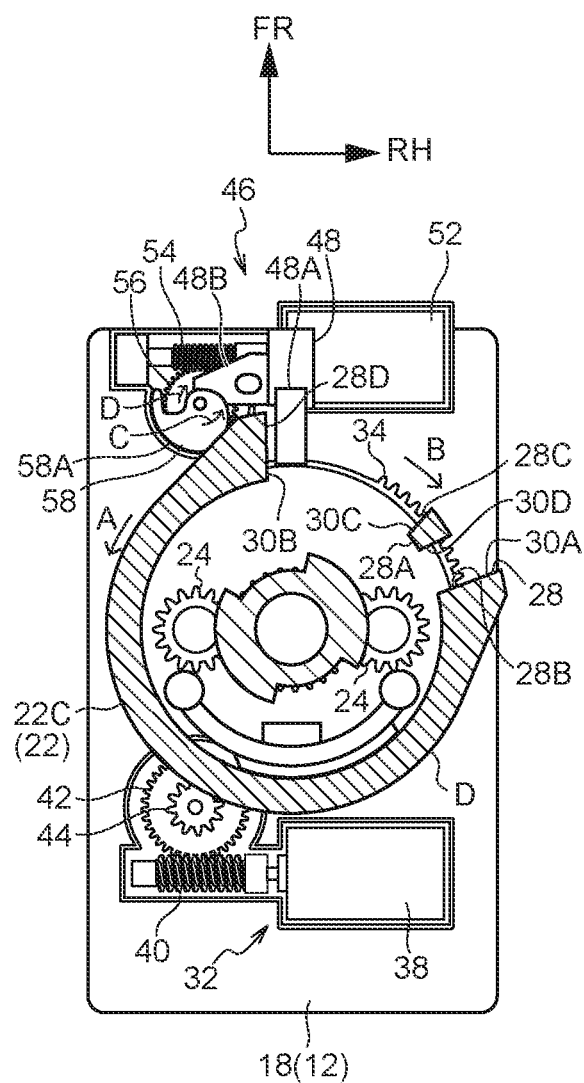

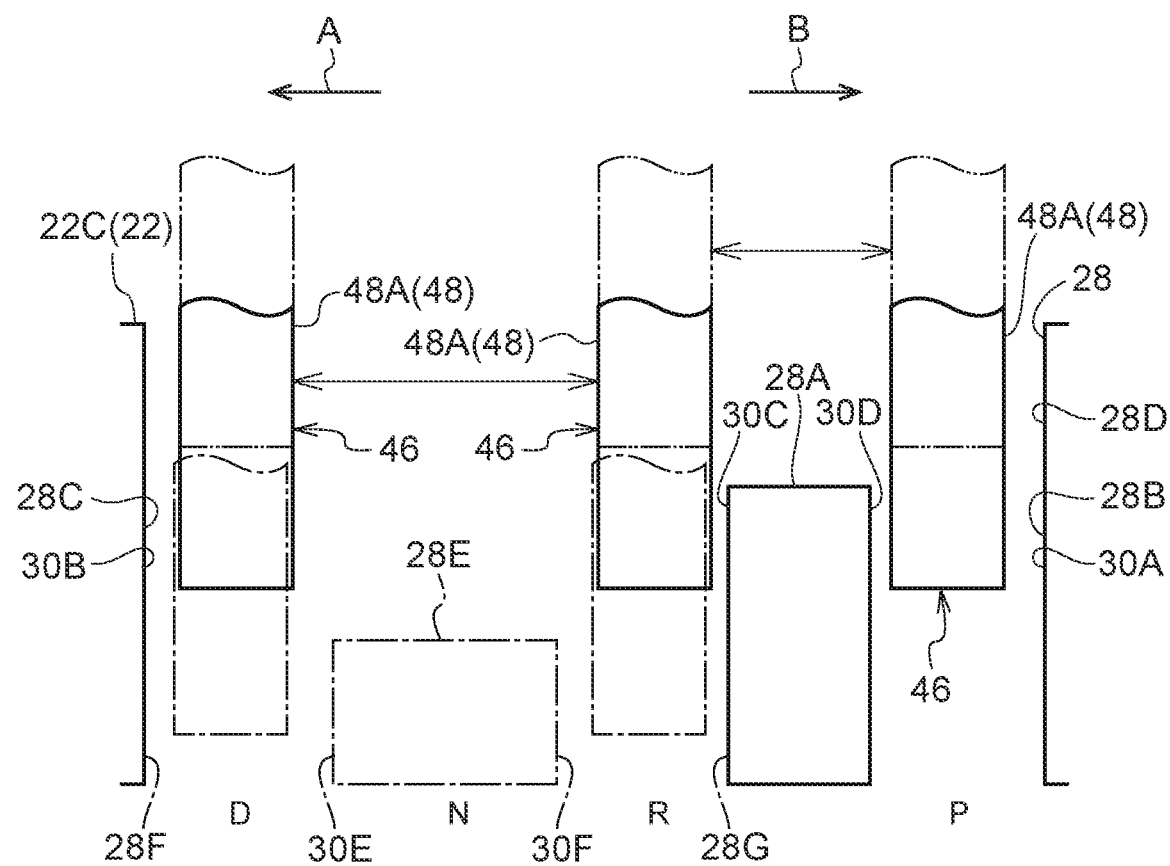

SHIFT DEVICE FOR VEHICLE

CROSS-REFERENCE TO RELATED APPLICATIONS

The present application is a U.S. National Phase of PCT/JP2018/030567 filed on Aug. 17, 2018, claiming priority under 35 USC 119 from Japanese Patent Application No. 2017-169723 filed Sep. 4, 2017, the disclosure of which is incorporated by reference herein.

TECHNICAL FIELD

The present disclosure relates to a shift device for a vehicle in which a shift body is moved, and a shift position is changed.

BACKGROUND ART

In the shift device disclosed in Japanese Patent Application National Publication No. 2016-539836, due to an adjusting ring being rotated, the adjusting ring rotates an operation element to the P position. Further, a locking element restricts rotation of the operation element from the P position for example.

In such a shift device, it is preferable to be able to stop, at a predetermined position, the rotation of the operation element by the adjusting ring.

SUMMARY OF INVENTION

Technical Problem

In view of the above-described circumstances, an object of the present disclosure is to provide a shift device that can stop the movement of a shift body by a moving unit, at a predetermined shift position.

Solution to Problem

A shift device for a vehicle of a first aspect of the present disclosure includes: a shift body that is moved and whose shift position is changed; a moving unit that moves the shift body; and a restricting body that restricts movement of the shift body by the moving unit at a predetermined shift position.

In a shift device for a vehicle of a second aspect of the present disclosure, in the shift device of the first aspect, the restricting body is disposed at a restricting position and restricts movement of the shift body by the moving unit at the predetermined shift position, and placement of the restricting body at the restricting position is maintained at a time when the moving unit moves the shift body to the predetermined shift position from a shift position that is other than the predetermined shift position.

In a shift device for a vehicle of a third aspect of the present disclosure, in the shift device of the first aspect or the second aspect, the predetermined shift position is an intermediate shift position in a moving direction of the shift body.

A shift device for a vehicle of a fourth aspect of the present disclosure, in the shift device of any one of the first aspect through the third aspect: the shift device for a vehicle includes a pair of restricted portions that are provided at the shift body, and, due to movement of the restricted portions being restricted by the restricting body, the restricting body restricts movement of the shift body by the moving unit at a pair of predetermined shift positions, and permits movement of the shift body by the moving unit between the pair of predetermined shift positions.

In a shift device for a vehicle of a fifth aspect of the present disclosure, in the shift device of any one of the first aspect through the fourth aspect, the restricting body is disposed at an additional restricting position and restricts movement of the shift body from the predetermined shift position.

In a shift device for a vehicle of a sixth aspect of the present disclosure, in the shift device of the fifth aspect, another restricted portion is further provided at the shift body, and at the additional restricting position, the restricting body restricts movement of the other restricted portion and restricts movement of the shift body from the predetermined shift position.

Advantageous Effects of Invention

In the shift device for a vehicle of the first aspect of the present disclosure, the shift body is moved, and the shift position thereof is changed. Moreover, the moving unit moves the shift body.

The restricting body restricts movement of the shift body by the moving unit at a predetermined shift position. Therefore, movement of the shift body by the moving unit can be stopped at the predetermined shift position.

In a shift device for a vehicle of a second aspect of the present disclosure, the restricting body is disposed at a restricting position and restricts movement of the shift body by the moving unit at the predetermined shift position.

At the time when the moving unit moves the shift body to the predetermined shift position from a shift position that is other than the predetermined shift position, placement of the restricting body at the restricting position is maintained. Therefore, at the time when the moving unit moves the shift body to the predetermined shift position from a shift position that is other than the predetermined shift position, even if the restricting body is not moved, the restricting body can restrict movement of the shift body by the moving unit at the predetermined shift position.

In the shift device for a vehicle of the third aspect of the present disclosure, the predetermined shift position is a shift position that is an intermediate position in the moving direction of the shift body. Therefore, movement of the shift body by the moving unit can be stopped at the shift position that is at the intermediate position of the moving direction of the shift body.

In the shift device for a vehicle of the fourth aspect of the present disclosure, movement of the pair of restricted portions of the shift body is restricted by the restricting body. Due thereto, the restricting body restricts movement of the shift body by the moving unit at the pair of predetermined shift positions, and permits movement of the shift body by the moving unit between the pair of predetermined shift positions. Therefore, at the time when the moving unit moves the shift body between the pair of predetermined shift positions, movement of the shift body can be stopped at the pair of predetermined shift positions.

In the shift device for a vehicle of the fifth aspect of the present disclosure, the restricting body is further disposed at the additional restricting position and restricts movement of the shift body from the predetermined shift position. Therefore, the moving operation of the shift body from the predetermined shift position can be restricted.

In the shift device for a vehicle of the sixth aspect of the present disclosure, movement of another restricted portion of the shift body is restricted by the restricting body. Due thereto, movement of the shift body from the predetermined shift position is restricted. Therefore, the moving operation of the shift body from the predetermined shift position can be restricted.

BRIEF DESCRIPTION OF DRAWINGS

FIGS. 3A through 3D are plan views that are seen from above and that show main portions of the shift device relating to the embodiment of the present invention, where FIG. 3A shows a time when rotation of a knob from a "P" position is restricted, FIG. 3B shows a time when rotation of the knob from the "P" position in a second direction is permitted, FIG. 3C shows a time when rotation of the knob from an "R" position in a first direction is restricted, and FIG. 3D shows a time when rotation of the knob from a "D" position in the second direction is restricted.

FIG. 4 is a schematic drawing that is seen from above and shows situations of restricted rotation of the knob and cancelling restriction, in the shift device relating to the embodiment of the present invention.

DESCRIPTION OF EMBODIMENTS

Figure 1:
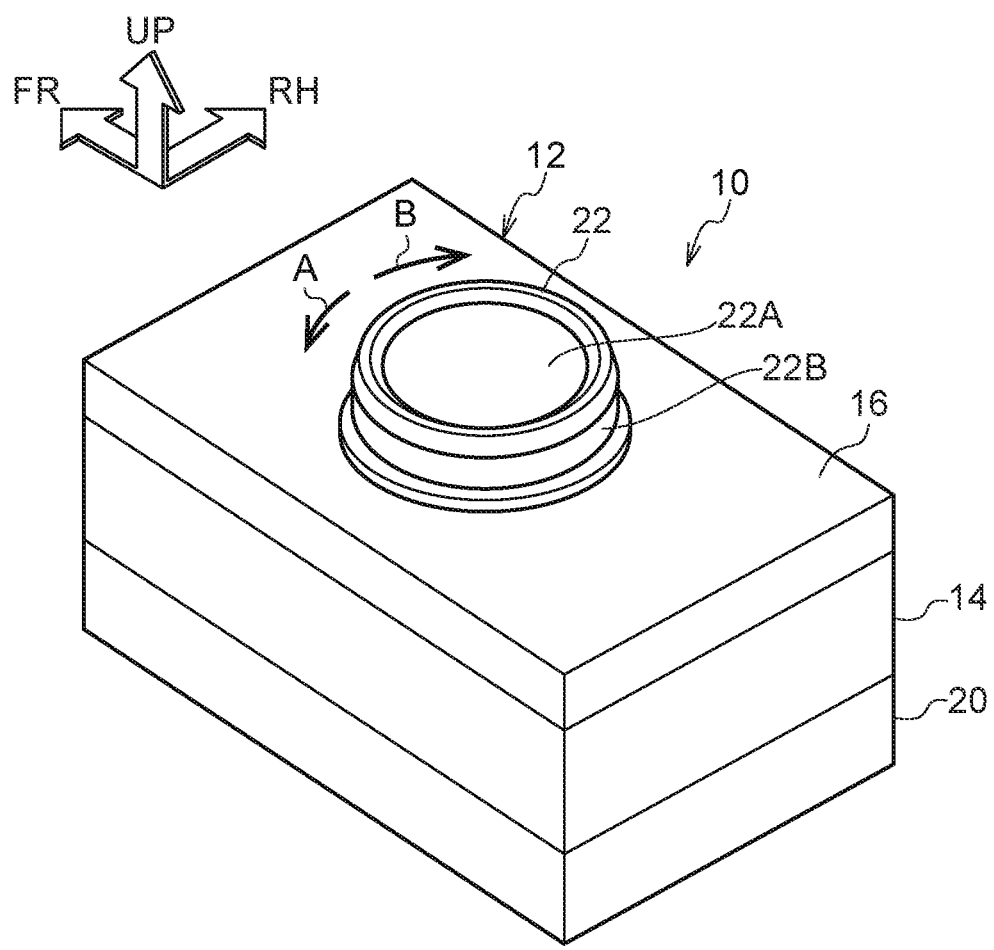
FIG. 1 is a perspective view that is seen from an obliquely left rear side, and shows a shift device relating to an embodiment of the present invention.
Figure 2:
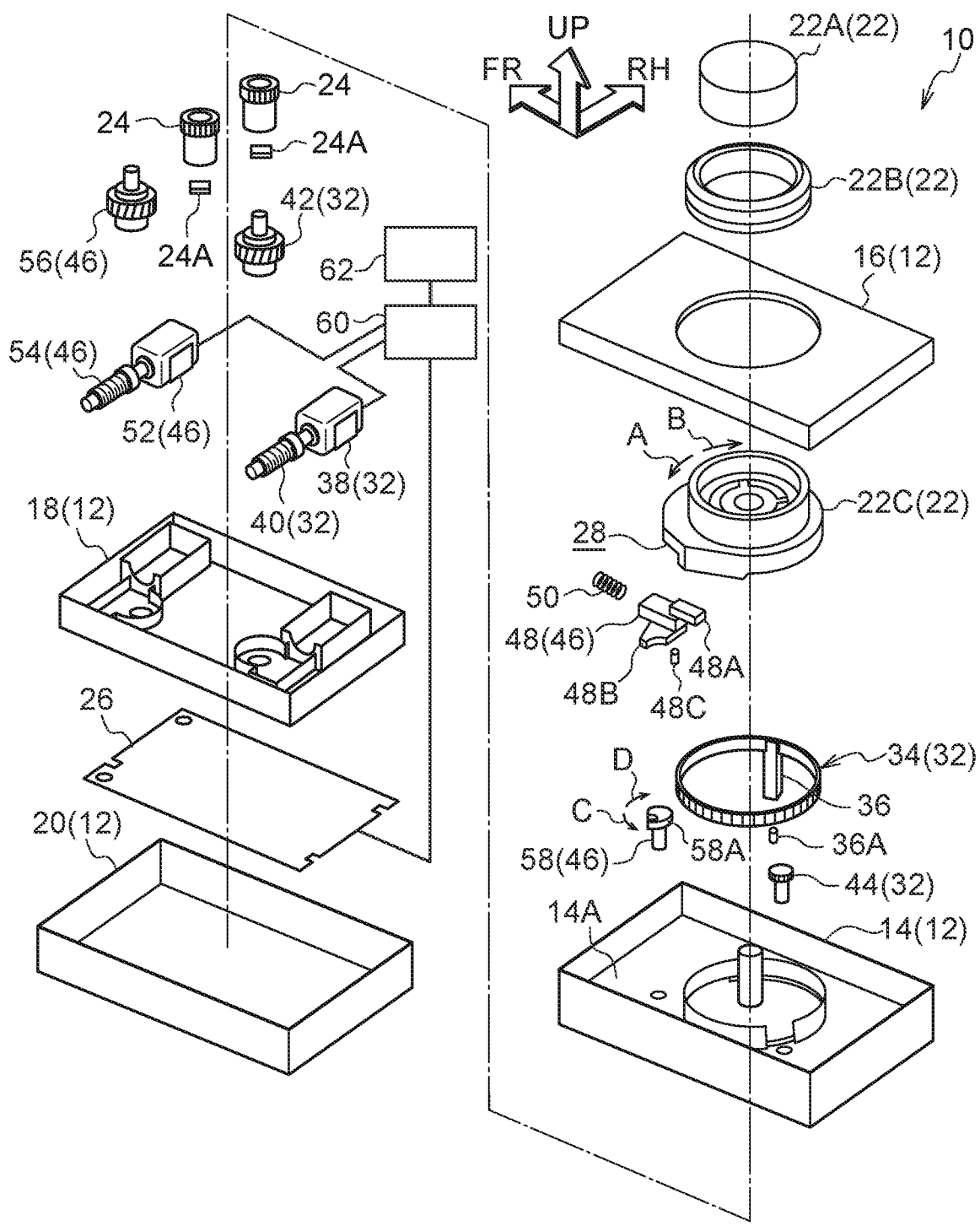
FIG. 2 is an exploded perspective view that is seen from an obliquely left rear side, and shows the shift device relating to the embodiment of the present invention.
Figure 3B:
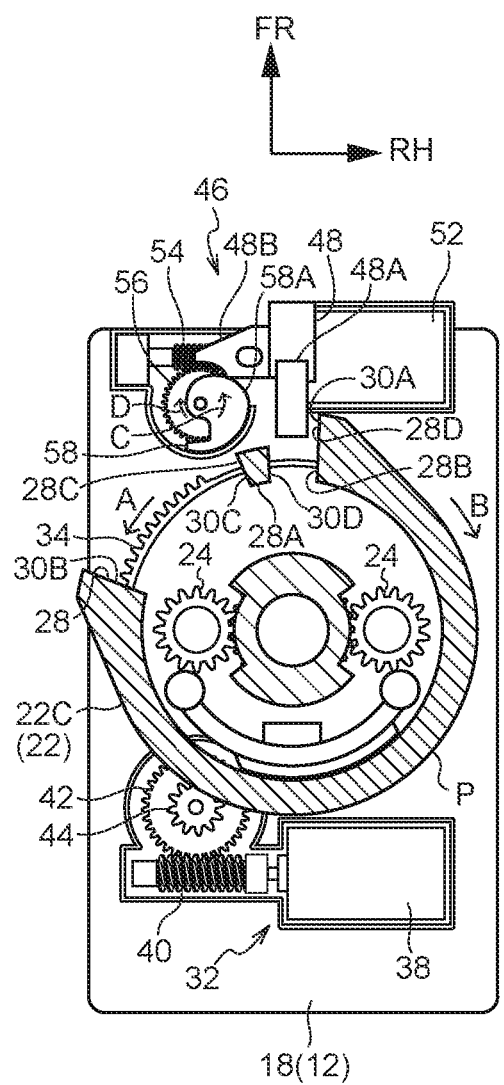

A shift device 10 relating to an embodiment of the present disclosure is illustrated in FIG. 1 in a perspective view seen from an obliquely left rear side. The shift device 10 is shown in FIG. 2 in an exploded perspective view seen from an obliquely left rear side. Note that, in the drawings, a front side of the shift device 10 is denoted by arrow FR, a right side of the shift device 10 is denoted by arrow RH, and an upper side of the shift device 10 is denoted by arrow UP.

The shift device 10 relating to the present embodiment is a so-called by-wire type device. The shift device 10 is set at a console (not illustrated) of a vehicle (an automobile), and is disposed at a vehicle front side and a vehicle transverse direction inner side of a driver's seat (not illustrated) of the vehicle. The front side, right side and upper side of the shift device 10 coincide with a front side, a right side and an upper side of the vehicle, respectively.

As shown in FIG. 1 and FIG. 2, a supporting body 12 is provided at the shift device 10. The supporting body 12 is fixed to an interior of the console.

A plate 14, which is substantially shaped as a rectangular parallelepiped box and serves as a first supporting member, is provided at the supporting body 12. The upper surface and the lower surface of the plate 14 are open. A supporting plate 14A that is substantially rectangular plate shaped is provided at an interior of the plate 14. The supporting plate 14A partitions the interior of the plate 14 into an upper side portion and a lower side portion. A cover 16, which is substantially shaped as a rectangular parallelepiped box and serves as a covering member, is provided at the supporting body 12 at an upper side of the plate 14. A lower surface of the cover 16 is open. The outer periphery of the cover 16 is fit-together with an outer periphery of the plate 14, and the cover 16 covers the upper side portion of the interior of the plate 14.

A motor case 18, which is substantially shaped as a rectangular parallelepiped box and serves as a second supporting member, is provided at the supporting body 12 at a lower side of the plate 14. An upper surface of the motor case 18 is open. An upper side portion of the motor case 18 is fit-together with the lower side portion of the interior of the plate 14. The upper side of the motor case 18 is covered by the supporting plate 14A of the plate 14. A case 20, which is substantially shaped as a rectangular parallelepiped box and serves as a housing member, is provided at the supporting body 12 at the lower side of the motor case 18. The upper surface of the case 20 is open. The lower side portion of the motor case 18 is fit-together with an interior of the case 20, and an outer periphery of the case 20 is fit-together with the outer periphery of the plate 14.

A knob 22, which is substantially cylindrical and serves as a shift body (operation body), is supported at the interior of the plate 14 at the upper side of the supporting plate 14A. The knob 22 can rotate (move) around a vertical direction. The knob 22 can rotate in a predetermined range in a first direction (the arrow A direction in FIG. 1 and the like) and in a second direction (the arrow B direction in FIG. 1 and the like). The knob 22 can be disposed at a "P" position (parking position) that serves as a shift position (a predetermined shift position and a specific shift position), an "R" position (reverse position) that serves as a shift position (a predetermined shift position), an "N" position (neutral position) that serves as a shift position, and a "D" position (drive position) that serves as a shift position (a predetermined shift position), in that order from the first direction side toward the second direction side.

A first knob 22A that is substantially cylindrical and a second knob 22B that is substantially shaped as a cylindrical tube, which respectively structure an operation member, are provided coaxially at the upper side portion of the knob 22. The first knob 22A is fit-together with an interior of the second knob 22B, and the first knob 22A and the second knob 22B can rotate integrally. The first knob 22A and the second knob 22B pass-through the upper wall of the cover 16 of the supporting body 12 and the console so as to be rotatable, and project-out into the vehicle cabin. The first knob 22A and the second knob 22B are rotatingly operated by a vehicle occupant, and the knob 22 is rotatingly operated.

A knob base 22C, which is substantially shaped as a cylindrical tube and serves as a shift main body, is provided coaxially at a lower side portion of the knob 22. The knob base 22C can rotate integrally with the first knob 22A and the second knob 22B. A pair of sensing gears 24 that serve as a shift detecting means mesh-together with the interior of the lower portion of the knob base 22C (refer to FIG. 3A through FIG. 3D). The pair of sensing gears 24 are supported in a state of being passed-through the supporting plate 14A of the plate 14. The pair of sensing gears 24 can rotate around the vertical direction. The knob 22 is rotated, and the pair of sensing gears 24 is rotated. Shift magnets 24A are respectively provided at the lower ends of the pair of sensing gears 24 so as to be able to rotate integrally therewith. A printed circuit board 26 that serves as a detecting means is fixed to the interior of the case 20 of the supporting body 12. The printed circuit board 26 detects magnetic forces of the shift magnets 24A of the pair of sensing gears 24. Due to the rotated positions of the pair of sensing gears 24 being detected, the rotated position of the knob 22 is detected, and the shift position of the knob 22 is detected.

As shown in FIG. 3A through FIG. 3D and FIG. 4, a passage hole 28 is formed at a front side portion of an outer peripheral portion of the lower end of the knob base 22C. The passage hole 28 extends in the peripheral direction (the rotation peripheral direction) of the knob 22, and opens at the radial direction (rotation radial direction) outer side of the knob 22. A surface located at a second direction side of the passage hole 28 is a P restricted surface 30A. A surface located at a first direction side of the passage hole 28 is a D restricted surface 30B that serves as a restricted portion. A restricted pillar 28A that is shaped substantially as a rectangular pillar is formed at the outer peripheral portion of the lower end of the knob base 22C, in a vicinity of the P restricted surface 30A within the passage hole 28. The restricted pillar 28A projects-out toward the lower side. An outer side surface in a knob 22 radial direction of the restricted pillar 28A is disposed at an intermediate position in the knob 22 radial direction of the passage hole 28. An inner side surface in the knob 22 radial direction of the restricted pillar 28A is disposed at an inner side end position in the knob 22 radial direction of the passage hole 28. A surface at the first direction side of the restricted pillar 28A is an R restricted surface 30C that serves as a restricted portion. A surface at the second direction side of the restricted pillar 28A is a P locking surface 30D. At the passage hole 28, a P locking hole 28B is designated between the P restricted surface 30A and the P locking surface 30D, and a restriction hole 28C is designated between the D restricted surface 30B and the R restricted surface 30C. A releasing hole 28D is designated at the passage hole 28 at an outer side in the knob 22 radial direction of the restricted pillar 28A, the P locking hole 28B and the restriction hole 28C.

A first entrained portion (not illustrated) serving as a first moved portion and a second entrained portion (not illustrated) serving as a second moved portion are formed at the outer peripheral portion of the lower end of the knob base 22C. The first entrained portion and the second entrained portion project-out toward the lower side.

As shown in FIG. 2 and FIG. 3A through FIG. 3D, an entraining mechanism 32 serving as a moving unit is provided at the lower side and the rear side of the knob 22.

An annular rotor cam 34 that serves as a moving member (entraining member) is provided at the entraining mechanism 32. The rotor cam 34 is supported at the upper side of the supporting plate 14A of the plate 14 so as to be rotatable around the vertical direction. The rotor cam 34 is disposed coaxially with the knob 22. The rotated position of the rotor cam 34 is disposed at a reference position (start position).

A first entraining portion (not illustrated) serving as a first moving portion and a second entraining portion (not illustrated) serving as a second moving portion are formed at the rotor cam 34. The first entraining portion and the second entraining portion project-out toward an upper side. The first entrained portion of the knob 22 is disposed at the first direction side of the first entraining portion so as to be apart therefrom. The second entrained portion of the knob 22 is disposed at the second direction side of the second entraining portion so as to be apart therefrom. Therefore, at the time when the knob 22 is rotatingly operated in a predetermined range (the range of the "P" position through the "D" position), the first entrained portion does not interfere with the first entraining portion, and the second entrained portion does not interfere with the second entraining portion.

A detection pillar 36 is formed at a peripheral direction portion of the rotor cam 34. The detection pillar 36 can rotate integrally with the rotor cam 34. The detection pillar 36 projects-out downward, and the detection pillar 36 is passed-through the supporting plate 14A so as to be rotatable. A driving magnet 36A is fixed to the lower end of the detection pillar 36. Due to the above-described printed circuit board 26 detecting the magnetic force of the driving magnet 36A, the rotated position of the detection pillar 36 is detected, and the rotated position of the rotor cam 34 is detected.

An entraining motor 38 serving as a moving drive unit is provided at the entraining mechanism 32. The entraining motor 38 is fixed to a rear side portion of the interior of the motor case 18. An entraining worm gear 40 serving as a moving output gear is fixed coaxially to an output shaft of the entraining motor 38. The entraining worm gear 40 can rotate integrally with the output shaft of the entraining motor 38. An entraining helical gear 42 serving as a moving connection gear is meshed-together with the entraining worm gear 40. The entraining helical gear 42 is passed-through the supporting plate 14A so as to be rotatable around the vertical direction. An intermediate gear 44 (a spur gear) is fixed coaxially to an upper side of the entraining helical gear 42. The intermediate gear 44 can rotate integrally with the entraining helical gear 42. The intermediate gear 44 is meshed-together with the outer periphery of the rotor cam 34. Due to the entraining motor 38 being driven, and the output shaft of the entraining motor 38 being rotated, the entraining worm gear 40, the entraining helical gear 42 and the intermediate gear 44 are rotated, and the rotor cam 34 is rotatingly driven.

A locking mechanism 46 serving as a restricting body is provided at the lower side and the front side of the knob 22.

A lock body 48 serving as a restricting body is provided at the locking mechanism 46. The lock body 48 is supported at the upper side of the supporting plate 14A so as to be movable in the front-rear direction. A lock bar 48A, which is shaped as a rectangular pillar and serves as a restricting member, is provided at the lock body 48. The lock bar 48A extends in the front-rear direction. The lock bar 48A extends-out toward the rear side, and the lock bar 48A is inserted in the passage hole 28 of the knob 22 (the knob base 22C) from the front side. An engaging plate 48B, which is substantially triangular plate shaped and serves as an engaging portion, is provided at the lock body 48. The engaging plate 48B extends-out toward a left side. A spring 50 (compression coil spring) serving as an urging member is provided at the front side of the lock body 48. The spring 50 spans between the lock body 48 and a front wall of the plate 14, and urges the lock body 48 toward the rear side. A lock magnet 48C is fixed to the lower end of the lock body 48. The above-described printed circuit board 26 detects a magnetic force of the lock magnet 48C, and the moved position of the lock body 48 is detected.

A locking motor 52 serving as a restricting drive mechanism is provided at the locking mechanism 46. The locking motor 52 is fixed to the front side portion of the interior of the motor case 18. A locking worm gear 54 serving as a restricting output gear is fixed coaxially to an output shaft of the locking motor 52. The locking worm gear 54 can rotate integrally with the output shaft of the locking motor 52. A locking helical gear 56 serving as a restricting connection gear is meshed-together with the locking worm gear 54. The locking helical gear 56 passes-through the supporting plate 14A so as to be rotatable around the vertical direction. A cam 58 serving as an operation member is fixed coaxially to an upper side of the locking helical gear 56. Due to the locking motor 52 being driven and the output shaft of the locking motor 52 being rotated, the locking worm gear 54 and the locking helical gear 56 are rotated, and the cam 58 can rotate integrally with the locking helical gear 56 in a releasing direction (an arrow C direction in FIG. 2 and the like) and in a restricting direction (an arrow D direction in FIG. 2 and the like).

A cam surface 58A is formed at an outer periphery of the cam 58. The cam surface 58A gradually moves away from the central axis (rotation central axis) of the cam 58 while heading toward the releasing direction. Due to the urging force of the spring 50, the engaging plate 48B of the lock body 48 is engaged, from the front side, with the cam surface 58A. At the time when the cam 58 is rotated in the releasing direction, the lock body 48 is moved toward the front side against the urging force of the spring 50. At the time when the cam 58 is rotated in the restricting direction, the lock body 48 is moved toward the rear side by the urging force of the spring 50. Therefore, the lock body 48 can be disposed at a releasing position that is at the front side and at a restricting position that is at the rear side. At the time when the lock body 48 is disposed at the releasing position, the lock bar 48A of the lock body 48 is inserted in as far as the releasing hole 28D of the knob 22 (the knob base 22C) (refer to FIG. 3B). At the time when the lock body 48 is disposed at the restricting position, the lock bar 48A is inserted in as far as the P locking hole 28B or the restriction hole 28C of the knob 22 (the knob base 22C) (refer to FIG. 3A, FIG. 3C and FIG. 3D).

The above-described printed circuit board 26, entraining motor 38 and locking motor 52 are electrically connected to a control device 60 of the vehicle. The brake 62 of the vehicle that serves as a releasing means is electrically connected to the control device 60. The vehicle brakes due to the brake 62 being operated by the vehicle occupant. Further, the vehicle can be parked automatically by control of the control device 60.

Operation of the present embodiment is described next.

At the shift device 10 of the above-described structure, at the time when the knob 22 is disposed at the "P" position (at the time when the printed circuit board 26 detects that the knob 22 is disposed at the "P" position), in a case in which the brake 62 is not being operated, at the locking mechanism 46, due to control of the control device 60, the locking motor 52 is driven forward, and the cam 58 is rotated in the restricting direction, and the lock body 48 is thereby moved to the rear side. At the time when the lock body 48 is moved to the restricting position (at the time when the printed circuit board 26 detects that the lock body 48 is moved to the restricting position), the forward driving of the locking motor 52 is stopped due to control of the control device 60, and the lock body 48 is disposed at the restricting position and the lock bar 48A of the lock body 48 is thereby inserted in as far as the P locking hole 28B of the knob 22 (refer to FIG. 3A and FIG. 4). Therefore, the lock bar 48A restricts rotation of the P restricted surface 30A of the knob 22 in the first direction and rotation of the knob 22 from the "P" position in the first direction is restricted. Further, the lock bar 48A restricts rotation of the P locking surface 30D of the restricted pillar 28A of the knob 22 in the second direction and rotation of the knob 22 from the "P" position in the second direction (toward the "R" position side) is restricted.

On the other hand, at the time when the knob 22 is disposed at the "P" position (at the time when the printed circuit board 26 detects that the knob 22 is disposed at the "P" position), in a case in which the brake 62 is operated, the locking motor 52 is driven reversely at the locking mechanism 46 due to control of the control device 60, and the cam 58 is rotated in the releasing direction and the lock body 48 is thereby moved to the front side. At the time when the lock body 48 is moved to the releasing position (at the time when the printed circuit board 26 detects that the lock body 48 is moved to the releasing position), due to control of the control device 60, the reverse driving of the locking motor 52 is stopped, and the lock body 48 is disposed at the releasing position and the lock bar 48A of the lock body 48 is thereby inserted in as far as the releasing hole 28D of the knob 22 (refer to FIG. 3B and FIG. 4). Therefore, the lock bar 48A restricts rotation of the P restricted surface 30A of the knob 22 in the first direction and rotation of the knob 22 from the "P" position in the first direction is restricted. Further, the lock bar 48A permits rotation of the P locking surface 30D of the restricted pillar 28A of the knob 22 in the second direction and rotation of the knob 22 from the "P" position in the second direction (toward the "R" position side) is permitted.

At the time when the knob 22 is disposed at the "R" position, the "N" position or the "D" position (at the time when the printed circuit board 26 detects that the knob 22 is disposed at the "R" position, the "N" position or the "D" position), in a case in which the brake 62 is not operated, the locking motor 52 is driven forward at the locking mechanism 46 due to control of the control device 60, and the cam 58 is rotated in the restricted direction and the lock body 48 is thereby moved to the rear side. At the time when the lock body 48 is moved to the restricting position (at the time when the printed circuit board 26 detects that the lock body 48 is moved to the restricting position), the forward driving of the locking motor 52 is stopped due to control of the control device 60, and the lock body 48 is disposed at the restricting position and the lock bar 48A of the lock body 48 is thereby inserted in as far as the restriction hole 28C of the knob 22 (refer to FIG. 3C and FIG. 3D, and FIG. 4). Therefore, in a case in which the knob 22 is at the "R" position, the lock bar 48A restricts rotation of the R restricted surface 30C of the restricted pillar 28A of the knob 22 in the first direction and rotation of the knob 22 from the "R" position in the first direction (toward the "P" position side) is restricted (refer to FIG. 3C). In a case in which the knob 22 is at the "D" position, the lock bar 48A restricts rotation of the D restricted surface 30B of the knob 22 in the second direction and rotation of the knob 22 from the "D" position in the second direction is restricted (refer to FIG. 3D).

On the other hand, at the time when the knob 22 is disposed at the "R" position, the "N" position or the "D" position (at the time when the printed circuit board 26 detects that the knob 22 is disposed at the "R" position, the "N" position or the "D" position), in a case in which the brake 62 is operated, the locking motor 52 is driven reversely at the locking mechanism 46 due to control of the control device 60, and the cam 58 is rotated in the releasing direction and the lock body 48 is thereby moved to the front side. At the time when the lock body 48 is moved to the releasing position (at the time when the printed circuit board 26 detects that the lock body 48 is moved to the releasing position), the reverse driving of the locking motor 52 is stopped due to control of the control device 60, and the lock body 48 is disposed at the releasing position and the lock bar 48A of the lock body 48 is thereby inserted in as far as the releasing hole 28D of the knob 22 (refer to FIG. 4). Therefore, in a case in which the knob 22 is at the "R" position, the lock bar 48A permits rotation of the R restricted surface 30C of the restricted pillar 28A of the knob 22 in the first direction, and rotation of the knob 22 from the "R" position in the first direction (toward the "P" position side) is permitted. In a case in which the knob 22 is at the "D" position, the lock bar 48A restricts rotation of the D restricted surface 30B of the knob 22 in the second direction, and rotation of the knob 22 from the "D" position in the second direction is restricted.

Further, for example, in a state in which the knob 22 is disposed at the "P" position (the printed circuit board 26 detects that the knob 22 is disposed at the "P" position) and the vehicle is stopped, the control device 60 is operated by the vehicle occupant, and automatic parking of the vehicle by control of the control device 60 is started. In the automatic parking of the vehicle, for example, the knob 22 is disposed from the "P" position to the "D" position (the printed circuit board 26 detects that the knob 22 is disposed at the "D" position), and the vehicle is advanced forward, and, thereafter, the knob 22 is disposed from the "D" position to the "R" position (the printed circuit board 26 detects that the knob 22 is disposed at the "R" position), and the vehicle is moved in reverse. Next, the knob 22 is disposed from the "R" position to the "D" position (the printed circuit board 26 detects that the knob 22 is disposed at the "D" position), and the vehicle is advanced forward, and, thereafter, the knob 22 is disposed from the "D" position to the "P" position (the printed circuit board 26 detects that the knob 22 is disposed at the "P" position), and the vehicle is stopped (parked), and the automatic parking of the vehicle is thereby finished.

Concretely, in the automatic parking of the vehicle, before the knob 22 is rotated from the "P" position toward the "D" position, the locking motor 52 is driven reversely at the locking mechanism 46 due to control of the control device 60, and the cam 58 is rotated in the releasing direction and the lock body 48 is thereby moved to the front side. At the time when the lock body 48 is moved to the releasing position (at the time when the printed circuit board 26 detects that the lock body 48 is moved to the releasing position), the reverse driving of the locking motor 52 is stopped due to control of the control device 60, and the lock body 48 is disposed at the releasing position and the lock bar 48A of the lock body 48 is thereby inserted in as far as the releasing hole 28D of the knob 22 (refer to FIG. 3B and FIG. 4). Therefore, the lock bar 48A permits rotation of the P locking surface 30D of the restricted pillar 28A of the knob 22 in the second direction, and there is a state in which rotation of the knob 22 from the "P" position in the second direction (toward the "R" position side) is permitted.

At the time when the knob 22 is disposed from the "P" position to the "D" position, the entraining motor 38 is driven reversely at the entraining mechanism 32 due to control of the control device 60, and the rotor cam 34 is rotated from the reference position in the second direction. Due thereto, the second entraining portion of the rotor cam 34 entrains (moves) the second entrained portion of the knob 22 in the second direction and the knob 22 is rotated in the second direction. At the time when the knob 22 is rotated to the "D" position (at the time when the printed circuit board 26 detects that the knob 22 is rotated to the "D" position), the reverse driving of the entraining motor 38 is stopped due to control of the control device 60, and the knob 22 is disposed at the "D" position (refer to FIG. 4).

At the time when the knob 22 is disposed at the "D" position (at the time when the printed circuit board 26 detects that the knob 22 is disposed at the "D" position), the locking motor 52 is driven forward at the locking mechanism 46 due to control of the control device 60, and the cam 58 is rotated in the restricting direction and the lock body 48 is thereby moved to the rear side. At the time when the lock body 48 is moved to the restricting position (at the time when the printed circuit board 26 detects that the lock body 48 is moved to the restricting position), the forward driving of the locking motor 52 is stopped due to control of the control device 60, and the lock body 48 is disposed at the restricting position and the lock bar 48A of the lock body 48 is thereby inserted in as far as the restriction hole 28C of the knob 22 (refer to FIG. 3D and FIG. 4). Therefore, next, at the time when the knob 22 is disposed from the "D" position to the "R" position, the lock bar 48A restricts rotation of the R restricted surface 30C of the restricted pillar 28A of the knob 22 in the first direction, and rotation of the knob 22 from the "R" position in the first direction (toward the "P" position side) is restricted.

At the time when the knob 22 is disposed from the "D" position to the "R" position, the entraining motor 38 is driven forward at the entraining mechanism 32 due to control of the control device 60, and the rotor cam 34 is rotated in the first direction. Due thereto, the first entraining portion of the rotor cam 34 entrains the first entrained portion of the knob 22 in the first direction, and the knob 22 is rotated in the first direction. At the time when the knob 22 is rotated to the "R" position (at the time when the printed circuit board 26 detects that the knob 22 is rotated to the "R" position), the forward driving of the entraining motor 38 is stopped due to control of the control device 60, and the knob 22 is disposed at the "R" position (refer to FIG. 3C and FIG. 4).

At the time when the knob 22 is disposed from the "R" position to the "D" position, the entraining motor 38 is driven reversely at the entraining mechanism 32 due to control of the control device 60, and the rotor cam 34 is rotated in the second direction. Due thereto, the second entraining portion of the rotor cam 34 entrains the second entrained portion of the knob 22 in the second direction, and the knob 22 is rotated in the second direction. At the time when the knob 22 is rotated to the "D" position (at the time when the printed circuit board 26 detects that the knob 22 is disposed at the "D" position), the reverse driving of the entraining motor 38 is stopped due to control of the control device 60, and the knob 22 is disposed at the "D" position (refer to FIG. 3D).

Before the knob 22 is rotated from the "D" position toward the "P" position, the locking motor 52 is driven reversely at the locking mechanism 46 due to control of the control device 60, and the cam 58 is rotated in the releasing direction and the lock body 48 is thereby moved to the front side. At the time when the lock body 48 is moved to the releasing position (at the time when the printed circuit board 26 detects that the lock body 48 is moved to the releasing position), the reverse driving of the locking motor 52 is stopped due to control of the control device 60, and the lock body 48 is disposed at the releasing position and the lock bar 48A of the lock body 48 is thereby inserted in as far as the releasing hole 28D of the knob 22 (refer to FIG. 4). Therefore, the lock bar 48A permits rotation of the R restricted surface 30C of the restricted pillar 28A of the knob 22 in the first direction, and there is a state in which rotation of the knob 22 from the "R" position in the first direction (toward the "P" position side) is permitted.

At the time when the knob 22 is disposed from the "D" position to the "P" position, the entraining motor 38 is driven forward at the entraining mechanism 32 due to control of the control device 60, and the rotor cam 34 is rotated in the first direction. Due thereto, the first entraining portion of the rotor cam 34 entrains the first entrained portion of the knob 22 in the first direction and the knob 22 is rotated in the first direction, and the knob 22 is rotated (returned) to the "P" position (refer to FIG. 3B and FIG. 4).

At the time when the knob 22 is disposed at the "P" position (at the time when the printed circuit board 26 detects that the knob 22 is disposed at the "P" position), the entraining motor 38 is driven reversely at the entraining mechanism 32 due to control of the control device 60, and the rotor cam 34 is rotated in the second direction. At the time when the rotor cam 34 is rotated to the reference position (at the time when the printed circuit board 26 detects that the rotor cam 34 is rotated to the reference position), the reverse driving of the entraining motor 38 is stopped due to control of the control device 60, and the rotor cam 34 is disposed at (returned to) the reference position.

Moreover, at the time when the knob 22 is disposed at the "P" position (at the time when the printed circuit board 26 detects that the knob 22 is disposed at the "P" position), the locking motor 52 is driven forward at the locking mechanism 46, and the cam 58 is rotated in the restricted direction, and the lock body 48 is thereby moved to the rear side. At the time when the lock body 48 is moved to the restricted position (at the time when the printed circuit board 26 detects that the lock body 48 is moved to the restricting position), the forward driving of the locking motor 52 is stopped due to control of the control device 60, and the lock body 48 is disposed at the restricting position, and the lock bar 48A of the lock body 48 is thereby inserted in as far as the P locking hole 28B of the knob 22 (refer to FIG. 3A and FIG. 4). Therefore, the lock bar 48A restricts rotation of the P locking surface 30D of the restricted pillar 28A of the knob 22 in the second direction, and rotation of the knob 22 from the "P" position in the second direction (toward the "R" position side) is restricted.

At the time when the knob 22 is rotated by the rotor cam 34 from the "P" position to the "D" position, and at the time when the knob 22 is rotated by the rotor cam 34 from the "R" position to the "D" position, the lock bar 48A restricts rotation of the D restricted surface 30B of the knob 22 in the second direction by the rotor cam 34, and rotation of the knob 22 in the second direction by the rotor cam 34 is restricted at the "D" position. Therefore, even in a case in which inertia acts on the rotor cam 34, rotation of the knob 22 in the second direction by the rotor cam 34 can be stopped at the "D" position.

Moreover, at the time when the knob 22 is rotated by the rotor cam 34 from the "D" position to the "R" position, the lock bar 48A restricts rotation of the R restricted surface 30C of the restricted pillar 28A of the knob 22 in the first direction by the rotor cam 34, and rotation of the knob 22 in the first direction by the rotor cam 34 is restricted at the "R" position. Therefore, even in a case in which inertia acts on the rotor cam 34, rotation of the knob 22 in the first direction by the rotor cam 34 can be stopped at the "R" position.

Furthermore, at the time when the knob 22 is rotated by the rotor cam 34 from the "D" position to the "P" position, the lock bar 48A restricts rotation of the P restricted surface 30A of the knob 22 in the first direction by the rotor cam 34, and rotation of the knob 22 in the first direction by the rotor cam 34 is restricted at the "P" position. Therefore, even in a case in which inertia acts on the rotor cam 34, rotation of the knob 22 in the first direction by the rotor cam 34 can be stopped at the "P" position.

Further, at the time when the knob 22 is rotated by the rotor cam 34 from the "N" position to the "D" position or the "R" position, the placement of the lock body 48 at the restricting position is maintained. Therefore, at the time when the knob 22 is rotated by the rotor cam 34 from the "N" position to the "D" position or the "R" position, even if the lock body 48 is not moved to the releasing position, the lock bar 48A can restrict rotation of the knob 22 by the rotor cam 34 at the "R" position and the "D" position, respectively.

Moreover, at the time when the knob 22 is rotated by the rotor cam 34 between the "D" position and the "R" position, the placement of the lock body 48 at the restricting position is maintained. Therefore, at the time when the knob 22 is rotated by the rotor cam 34 between the "D" position and the "R" position, even if the lock body 48 is not moved to the releasing position, the lock bar 48A can restrict rotation of the knob 22 by the rotor cam 34 at the "R" position and the "D" position.

Moreover, at the time when the knob 22 is rotated by the rotor cam 34 between the "D" position and the "R" position, due to rotation of the R restricted surface 30C and the D restricted surface 30B of the knob 22 being restricted by the lock bar 48A, the lock bar 48A restricts rotation of the knob 22 by the rotor cam 34 at the "D" position and the "R" position, and permits rotation of the knob 22 by the rotor cam 34 between the "D" position and the "R" position. Therefore, at the time when the knob 22 is rotated by the rotor cam 34 between the "D" position and the "R" position, rotation of the knob 22 can be stopped at the "D" position and the "R" position.

Further, at the time when the knob 22 is rotated by the rotor cam 34 from the "D" position to the "R" position, rotation of the knob 22 by the rotor cam 34 is restricted at the "R" position that is at an intermediate position of the rotating direction of the knob 22. Therefore, rotation of the knob 22 by the rotor cam 34 can be stopped at the "R" position that is at the intermediate position of the rotating direction of the knob 22.

Modified Example

As shown by the one-dot chain line in FIG. 4, in the present modified example, a lock pillar 28E is formed at the outer peripheral portion of the lower end of the knob base 22C, between the restricted pillar 28A and the D restricted surface 30B at the interior of the passage hole 28. The lock pillar 28E projects-out toward the lower side. An outer side surface in the knob 22 radial direction of the lock pillar 28E is disposed at a position that is in a middle in the knob 22 radial direction of the restricted pillar 28A. An inner side surface in the knob 22 radial direction of the lock pillar 28E is disposed at an inner side end position in the knob 22 radial direction of the passage hole 28. A surface at a first direction side of the lock pillar 28E is a D locking surface 30E, and a surface at a second direction side of the restricted pillar 28A is an R locking surface 30F. At the passage hole 28, a D locking hole 28F is formed between the D restricted surface 30B and the D locking surface 30E, and an R locking hole 28G is formed between the R restricted surface 30C and the R locking surface 30F. The restriction hole 28C is formed further toward an outer side in the knob 22 radial direction than the lock pillar 28E, the D locking hole 28F and the R locking hole 28G.

At the locking mechanism 46, the lock bar 48A extends toward the rear side. In addition to the releasing position and the restricting position, the lock body 48 is disposed at a locking position that serves as an additional restricted position and that is further toward the rear side than the restricted position. The lock bar 48A can be inserted in as far as the D locking hole 28F and the R locking hole 28G of the knob 22 (the knob base 22C).

In automatic parking of the vehicle, at the time when the knob 22 is disposed from the "P" position or the "R" position to the "D" position (at the time when the printed circuit board 26 detects that the knob 22 is disposed at the "D" position), the locking motor 52 is driven forward at the locking mechanism 46 due to control of the control device 60, and the cam 58 is rotated in the restricting direction and the lock body 48 is thereby moved to the rear side. At the time when the lock body 48 is moved to the locking position (at the time when the printed circuit board 26 detects that the lock body 48 is moved to the locking position), the forward driving of the locking motor 52 is stopped due to control of the control device 60, and the lock body 48 is disposed at the locking position and the lock bar 48A is thereby inserted in as far as the D locking hole 28F of the knob 22. Therefore, the lock bar 48A restricts rotation of the D locking surface 30E of the lock pillar 28E of the knob 22 in the first direction, and rotation of the knob 22 from the "D" position in the first direction (toward the "N" position side) is restricted.

Before the knob 22 is rotated from the "D" position toward the "R" position, the locking motor 52 is driven reversely at the locking mechanism 46 due to control of the control device 60, and the cam 58 is rotated in the releasing direction and the lock body 48 is thereby moved to the front side. At the time when the lock body 48 is moved to the restricting position (at the time when the printed circuit board 26 detects that the lock body 48 is moved to the restricting position), the reverse driving of the locking motor 52 is stopped due to control of the control device 60, and the lock body 48 is disposed at the restricting position and the lock bar 48A is thereby inserted in as far as the restriction hole 28C of the knob 22. Therefore, the lock bar 48A permits rotation of the D locking surface 30E of the lock pillar 28E of the knob 22 in the first direction and rotation of the knob 22 from the "D" position in the first direction (toward the "N" position side) is permitted.

At the time when the knob 22 is disposed from the "D" position to the "R" position (at the time when the printed circuit board 26 detects that the knob 22 is disposed at the "R" position), the locking motor 52 is driven forward at the locking mechanism 46 due to control of the control device 60, and the cam 58 is rotated in the restricting direction, and the lock body 48 is thereby moved to the rear side. At the time when the lock body 48 is moved to the locking position (at the time when the printed circuit board 26 detects that the lock body 48 is moved to the locking position), the forward driving of the locking motor 52 is stopped due to control of the control device 60, and the lock body 48 is disposed at the locking position and the lock bar 48A is thereby inserted in as far as the R locking hole 28G of the knob 22. Therefore, the lock bar 48A restricts rotation of the R locking surface 30F of the lock pillar 28E of the knob 22 in the second direction, and rotation of the knob 22 from the "R" position in the second direction (toward the "N" position side) is restricted.

Before the knob 22 is rotated from the "R" position toward the "D" position, the locking motor 52 is driven reversely at the locking mechanism 46 due to control of the control device 60, and the cam 58 is rotated in the releasing direction, and the lock body 48 is thereby moved to the front side. At the time when the lock body 48 is moved to the restricting position (at the time when the printed circuit board 26 detects that the lock body 48 is moved to the restricting position), the reverse driving of the locking motor 52 is stopped due to control of the control device 60, and the lock body 48 is disposed at the restricting position and the lock bar 48A is thereby inserted in as far as the restriction hole 28C of the knob 22. Therefore, the lock bar 48A permits rotation of the R locking surface 30F of the lock pillar 28E of the knob 22 in the second direction, and rotation of the knob 22 from the "R" position in the second direction (toward the "N" position side) is permitted.

Before the knob 22 is rotated from the "D" position toward the "P" position, the locking motor 52 is driven reversely at the locking mechanism 46 due to control of the control device 60, and the cam 58 is rotated in the releasing direction and the lock body 48 is thereby moved to the front side. At the time when the lock body 48 is moved to the releasing position (at the time when the printed circuit board 26 detects that the lock body 48 is moved to the releasing position), the reverse driving of the locking motor 52 is stopped due to control of the control device 60, and the lock body 48 is disposed at the releasing position and the lock bar 48A is thereby inserted in as far as the releasing hole 28D of the knob 22. Therefore, the lock bar 48A permits rotation of the D locking surface 30E of the lock pillar 28E of the knob 22 in the first direction, and rotation of the knob 22 from the "D" position in the first direction (toward the "N" position side) is permitted. Further, the lock bar 48A permits rotation of the R restricted surface 30C of the restricted pillar 28A of the knob 22 in the first direction, and rotation of the knob 22 from the "R" position in the first direction (toward the "P" position side) is permitted.

In the present modified example as well, operation and effects that are similar to those of the above-described embodiment can be achieved, except for the operation and effects that are due to the placement of the lock body 48 at the restricting position being maintained at the time when the knob 22 is rotated by the rotor cam 34 between the "D" position and the "R" position.

Moreover, at the time when the knob 22 is disposed at the "D" position by the rotor cam 34, the lock bar 48A of the lock body 48 restricts rotation of the D locking surface 30E and the D restricted surface 30B of the knob 22, and rotation of the knob 22 from the "D" position in the first direction and the second direction is restricted. Moreover, at the time when the knob 22 is disposed at the "R" position by the rotor cam 34, the lock bar 48A of the lock body 48 restricts rotation of the R locking surface 30F and the R restricted surface 30C of the knob 22, and rotation of the knob 22 from the "R" position in the first direction and the second direction is restricted. Therefore, at the time when the knob 22 is disposed by the rotor cam 34 at the "D" position and the "R" position (shift positions at which the vehicle progresses), the knob 22 can be restricted from being rotatingly operated from the "D" position and the "R" position, inadvertently.

Note that, in the above-described embodiment (including the modified example), the knob 22 is rotatingly operated in the first direction and the second direction. However, by extending the knob 22 out in the radial direction and providing the operating portion so as to be able to rotate integrally therewith, the operating portion may be rotatingly operated, and the knob 22 rotated in the first direction and the second direction.

Moreover, in the above-described embodiment (including the modified example), the entraining mechanism 32 rotates the knob 22 in the first direction and the second direction at the time of automatic parking of the vehicle. However, the entraining mechanism 32 may rotate the knob 22 in the first direction and the second direction at the time of automatic driving (the time of automatic traveling) of the vehicle.

Moreover, in the above-described embodiment (including the modified example), the shift device 10 is set at the console. However, the shift device 10 may be set at the instrument panel or the column cover.

The disclosure of Japanese Patent Application No. 2017-169723 is, in its entirety, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A shift device for a vehicle, comprising:
   a shift body that is moved and whose shift position is changed to a plurality of shift positions;
   a moving unit that moves the shift body; and
   a restricting body that restricts movement of the shift body by the moving unit at a predetermined shift position among the plurality of shift positions,
   wherein the shift body is formed with a restriction hole,
   wherein the restricting body is moveable into a restricting position within the restriction hole to restrict movement of the shift body by the moving unit at the predetermined shift position, and placement of the restricting body at the restricting position is maintained from a time at which the moving unit moves the shift body from a shift position that is other than the predetermined shift position until a time at which the shift body reaches the predetermined shift position and abuts the restricting body,
   wherein the plurality of shift positions are positioned so as to be apart from one another along an outer periphery of the shift body, the predetermined shift position is at an intermediate position of the plurality of shift positions of the shift body, and the restricting body restricts movement of the shift body at the predetermined shift position within the restriction hole,
   wherein the restriction hole is a continuous hole along an outer peripheral direction of the shift body,
   wherein the restriction hole includes a plurality of restriction positions that correspond to the plurality of shift positions,
   wherein a restriction pillar is formed at the shift body, and
   wherein a first face in the shift body peripheral direction of the restriction pillar is a first restriction face that restricts the movement of the shift body at the predetermined shift position.

2. The shift device for a vehicle of claim 1, wherein:
   the predetermined shift position is two positions of the plurality of shift positions,
   a second face in the shift body peripheral direction of the shift body is a second restriction face that restrict the movement of the shift body at a second predetermined shift position, and
   due to movement of the first restriction face and the second restriction face being restricted by the restricting body, the restricting body restricts movement of the shift body by the moving unit at the two predetermined shift positions, and permits movement of the shift body by the moving unit between the two predetermined shift positions.

3. The shift device for a vehicle of claim 2, wherein the restricting body is further disposed at an additional restricting position and restricts movement of the shift body from the predetermined shift position.

4. The shift device for a vehicle of claim 3, wherein:
   another restricted pillar is further provided at the shift body, and at the additional restricting position, the restricting body restricts movement of the other restricted pillar and restricts movement of the shift body from the predetermined shift position.

* * * * *